3,505,274
METHOD OF BLENDING POLYVINYL CHLORIDE
Theodor Kolberg, 19 Ernsbergerstrasse,
8 Munich 60, Germany
No Drawing. Filed Oct. 31, 1966, Ser. No. 590,527
Claims priority, application Germany, Nov. 2, 1965,
K 57,544
Int. Cl. C08f *47/20;* C08d *9/08*
U.S. Cl. 260—34.2              3 Claims

ABSTRACT OF THE DISCLOSURE

Forming vulcanizable or thermoplastic blends of polyvinylchloride with an elastomer or a thermoplastic material by forming a plastisol of a vinylchloride polymer; ripening the plastisol; and then mixing the ripened plastisol with the elastomer or thermoplastic.

---

The present invention relates to a method of blending polyvinyl chloride and, more particularly, the present invention is concerned with producing blends of polyvinyl chloride and materials capable of being blended with polyvinyl chloride, such as various types of rubber and certain other thermoplastic materials. According to a preferred embodiment, the present invention is concerned with forming blends of butadiene-acrylonitrile-rubber and polyvinyl chloride.

Blends of butadiene-acrylonitrile-rubber and polyvinyl chloride are known. The addition of polyvinyl chloride to vulcanizable butadiene-acrylonitrile-rubber mixtures improves the resistance of the product against ozone, reduces inflammability and improves the resistance against oil and motor fuels. Furthermore, in the plastics industry, butadiene-acrylonitrile-rubber is used as non-migratory plasticizer for polyvinyl chloride.

However, considerable difficulties are experienced in producing such blends in accordance with the methods conventionally utilized in the rubber industry. Thus, by incorporating the polyvinyl chloride powder like a filler on a cold mill, a product is obtained which, due to non-uniform dispersion, has poor physical properties and is not resistant against ozone, even if vulcanization is carried out above the fluxing temperature of the polyvinyl chloride.

If the mixing is carried out at higher temperatures, however below fluxing temperature, for instance at temperatures of between 80° and 90° C., it may be possible to obtain a product of high resistance against ozone, however, the ultimate elongation is relatively small and the Shore hardness relatively high. In order to achieve satisfactory resistance against ozone, the proportion of polyvinyl chloride should be equal to at least about 40% of the combined weight of polyvinyl chloride and butadiene-acrylonitrile-rubber, the polyvinyl chloride should be in the form of an emulsion polymerizate of low K-value and the butadiene-acrylonitrile-rubber should have a medium acrylonitrile content. Suspension polymerizates, polyvinyl chloride types of higher K-value, and butadiene-acrylonitrile-rubber of low acrylonitrile content do not give satisfactory results.

Better products can be obtained by mixing the butadiene-acrylonitrile-rubber with the polyvinyl chloride above the fluxing temperature which, depending on the type of polyvinyl chloride and plasticizer used, will be between about 150 and 170° C., and by then admixing the other compounding ingredients such as pigments, curing agents and the like. However, to produce these blends with the conventional mixing devices of the rubber industry is difficult and, consequently, the lastmentioned method has not found general acceptance.

Due to the mentioned mixing difficulties, prefluxed elastomer blends of butadiene-acrylonitrile-rubber and polyvinyl chloride have been introduced commercially. Since the fluxing of the butadiene-acrylonitrile-rubber/polyvinyl chloride blend causes a very significant rise in the Defo-hardness and the Mooney viscosity, thereby impeding the working of the blend, it is necessary to use in the production of these blends a butadiene-acrylonitrile-rubber of lower molecular weight than that of the conventional solid, commercially available butadiene-acrylonitrile-rubber. In this manner, i.e. by using such rubber of lower molecular weight, it is possile to form a blend with a sufficiently low Mooney viscosity.

Furthermore, blends are commercially available which are produced by mixing the latices of the two components, i.e., of the butadiene-acrylonitrile-rubber and the polyvinyl chloride. However, due to their high emulsifier content, these blends have a lower resistance against water than the blends formed of a butadiene-acrylonitrile-rubber of low water-swelling properties and polyvinyl chloride of the suspension polymerizate type.

It is therefore an object of the present invention to overcome the above-discussed difficulties and disadvantages.

It is further an object of the present invention to provide a mixing process which can be carried out with the conventional mixing devices of the rubber industry and which will result in the forming of blends having an excellently uniform dispersion of butadiene-acrylonitrile-rubber, polyvinyl chloride and plasticizer, which blend may be produced of butadiene-acrylonitrile-rubbers of any desired acrylonitrile content and of polyvinyl chloride types which may be suspension or emulsion types of any desired K-value.

It is another object of the present invention to provide a method of blending which permits the blending of any desired proportions of the butadiene-acrylonitrile-rubber relative to the polyvinyl chloride content of the blend.

It is still another object of the present invention to provide a method of blending polyvinyl chloride with rubbers of various types or with thermoplastic plastics, which method can be carried out in a simple and economical manner and will result in the formation of a highly uniform blend.

Other objects and advantages of the present invention will become apparent from a further reading of the description and of the appended claims.

With the above and other objects in view, the present invention is concerned with a method of forming vulcanizable or thermoplastic blends of polyvinyl chloride and a rubber or rubber blend or thermoplastic plastic compatible with polyvinyl chloride, comprising the steps of forming a plastisol of a pastable polymerizate and/or co-polymerizate consisting essentially of vinylchloride and of a plasticizer or a blend of plasticizers, with the addition of conventional stabilizers, allowing the plastisol to ripen, and thereafter forming an intimate mixture of the plastisol and the rubber or rubber blend or thermoplastic plastic, and, if desired, pigments and other conventional ingredients for forming vulcanizable or thermoplastic compounds. This mixture can be produced in the mixing devices conventionally available in the rubber industry.

If ripening is carried out at room temperature, the same should take at least about half a day.

The following examples are given as illustrative only, without, however, limiting the invention to the specific details of the examples.

EXAMPLE 1

A heat- oil- and ozone-resistant mixture according to the present invention is produced of the following components

| | Parts by weight |
|---|---|
| Butadiene - acrylonitrile - rubber, 28% acrylonitrile (Hycar 1053, B. F. Goodrich Chemical Co.) | 80 |
| Butadiene - acrylonitrile - rubber, highly viscous (Hycar 1312, B. F. Goodrich Chemical Co.) | 20 |
| Zinx oxide | 5 |
| High reinforcing silica (hydrated silica) (Hi-Sil 233, Columbia-Southern Chemical Corp.) | 75 |
| ISAF-Russ (Corax 6, Degussa) | 5 |
| Plastisol: | |
| Polyvinyl chloride, suspension type, K-value 70 (Vinnol P–100/70, Wacker-Chemie G.m.b.H.) | 50 |
| $C_{6,8,10}$ alcohol - phthalate (Plasticizer N–61, Chemische Fabrik von Heyden AG) | 50 |
| Barium-cadmium-zinc stabilizer (AO–913, Otto Bärlocher G.m.b.H.) | 1.5 |
| Diethyleneglycol | 2 |
| Aromatic polyester (Plasticator FH, Farbenfabriken Bayer AG) | 10 |
| Sulfur | 1.2 |
| Dibenzothiazyl disulfide (Altax, RT Vanderbilt Co. Inc.) | 4 |
| Zinc dimethyl-dithiocarbamate (Methyl Zimate, RT Vanderbilt Co. Inc.) | 2 |

The plastisol is first produced, for instance in a high speed mixer. First the liquid constituents of the plastisol are introduced into the container, and thereafter the polyvinyl chloride is introduced in large portions under continuing stirring. After stirring for between about 7 and 10 minutes, so as to obtain a homogeneous mixture, the plastisol is allowed to stay for at least half a day in order to ripen.

An internal mixer of the Banbury type is charged with the various constituents at an initial temperature of about 90° C., a speed of rotation of 40 r.p.m. under only slight water cooling in the indicated sequence and without any appreciable intermission between the introduction of the individual materials, as follows:

Solid acrylonitrile rubber, zinc oxide, sulfur, hydrated silica, carbon black, plastisol, liquid acrylonitrile rubber, and finally, aromatic polyester. After mixing for about 1 minute, the floating weight is raised and the fillers which are pressed out of the mixing chamber are again introduced into the mixing chamber, and mixing is continued for another 1½ minutes. The dump temperature will be about 168° C.

The accelerators are admixed to the previously formed mixture in the Banbury mixer for about 1½ minutes at an initial temperature of about 70 C. and a dump temperature of about 115°C .

Test specimens from 2 mm. sheets, cured at 152° C. for 20 minutes, have the following properties: ultimate tensile strength 195 kg./cm.$^2$, ultimate elongation 650%, hardness 65 Durometer A. Ozone aging at 200 p.p.h.m. for 96 hours at 40% strain causes no cracks.

This example shows that it is possible, in accordance with the method of the present invention, to mix, in a single operation and in a relatively short mixing cycle, high reinforcing fillers and even highly active silica, together with relatively large amounts of plasticizers and adhesive polymeric plasticizers, whereas in accordance with conventional mixing techniques, highly active fillers and plasticizers must be separately and alternatingly mixed into partial portions of the mixture in order to obtain the desired uniform dispersion. Thus, the conventional mixing techniques require considerable longer mixing cycles.

EXAMPLE 2

A mixture free of fillers and including large proportions of polyvinyl chloride and plasticizers is produced in a Banbury mixer of the following components:

| | Parts by weight |
|---|---|
| Butadiene - acrylonitrile - rubber, 33% acrylonitrile (Hycar 1052) | 100 |
| Zinc oxide | 5 |
| Sulfur | 1.7 |
| Plastisol: | |
| Polyvinylchloride suspension type K-value 70 (Vinnol P–100/70 Wacker-Chemie G.m.b.H) | 200 |
| Dioctylphthalate | 120 |
| Barium - cadmium - zinc stabilizer (AO–913, Otto Bärlocher G.m.b.H.) | 300 |
| Colored pigment paste in dioctylphthalate | 3 |
| Cyclohexyl benzothiazole sulfenamide (Santocure, Monsanto Chemical Co.) | 2 |
| Diphenylguanidine (Vulcaid DPG, Binney & Smith Co.) | 1 |
| | 435.7 |

At an interior temperature of the Banbury mixer of between about 110–120° C., and without water cooling, at 40 r.p.m., first the butadiene-acrylonitrile-rubber and the zinc oxide and the sulfur are introduced into the mixer, and thereafter the plastisol is poured into the same. Since the compound builds up only little heat during mixing, due to the absence of fillers, the batch will have a dump temperature of only about 125° C. Thus, the polyvinyl chloride will not yet be fully gelled. After cooling of the batch, the accelerators are admixed either on a a mill, or in a Banbury-type mixer.

Notwithstanding the high polyvinyl chloride and plasticizer proportions and the non-fluxing of the polyvinyl chloride, the thus obtained product has good physical properties and an excellent resistance against ozone, namely: an ultimate tensile strength of about 145 kg./cm.$^2$, ultimate elongation of about 600%, hardness of 62 Durometer A.

EXAMPLE 3

The mixture described in Example 2 may be produced on a mill in the following manner: First, the rubber is banded on the cold mill, and thereafter zinc oxide and sulfur are incorporated. This is followed by the addition of the ripened plastisol, whereby, preferably, the temperature of the rolls is raised to such an extent that the plastisol will become solidified due to starting gelation. At sufficiently high temperatures the plastisol may be continuously added to the rubber and admixed within a few minutes. Depending on the type and amount of fillers, polyvinyl chloride and plasticizers, the mill temperature will be maintained between about 80 and 120° C., and the temperature of the compound at between about 110 and 140° C. For complete gelling of the polyvinyl chloride these temperatures may be correspondingly increased. Thereafter, the mixture is withdrawn from the rollers and the mixture is permitted to cool sufficiently so that the accelerators may be admixed. If the formula requires introduction of fillers, the same are preferably added after zinc oxide and sulfur on the still cold rolls.

If it is desired to produce solutions for spread coating, butadiene-acrylonitrile-rubber/polyvinyl chloride blends with already fully gelled polyvinyl chloride have certain disadvantages, particularly that it is muchmore difficult to dissolve such blends in the conventional solvents used for producing solutions for spread coating, for instance toluene, in contrast to butadiene-acrylonitrile mixtures which do not include polyvinyl chloride, the latter being easily soluble in toluene. This disadvantage can be avoided by first mixing only the rubber with the conventional ingredients of rubber mixtures, forming a solution thereof and mixing under stirring the thus-formed solution with the ripened plastisol. If the plastisol is produced like a dip-coating plastisol with a relatively low viscosity, and if the rubber is dissolved in only as much solvent as is necessary in order to form a rubber solution, it is possible to produce in this manner solutions for spread coating which have a relatively high solids content of between about 55 and 70%.

The ripening of the plastisol is of considerable importance. During the ripening process, the plasticizer is taken soaking and softening and thereby swelling up to a large extent by the polyvinyl chloride under simultaneous swelling of the polyvinyl chloride. Thus, of the two different substances, namely the polyvinyl chloride and the plasticizer, so to say, a new material in latent form is produced which, upon heating, is transformed into soft polyvinyl chloride. In this condition of the ripened plastisol there is an excellent compatibility with butadiene-acrylonitrile-rubber of low as well as of high acrylonitrile content. Upon mixing, at rising temperature, the plastisol changes from a liquid into a solid state so that the viscosities of the plastisol and the thermoplastically softened rubber are about the same and the plastisol is incorporated into the rubber in a surprisingly short period of time, whereby the plasticizer remains substantially completely in the polyvinyl-chloride. This explains the excellent uniformity of the dispersion of butadiene-acrylonitrile-rubber, polyvinyl chloride and plasticizer, and consequently also the excellent physical properties of the thus produced blend.

It is well known that upon blending of butadiene-acrylonitrile-rubber with polyvinyl chloride, the hardness is greatly increased. Due to the ripening, the plasticizer of the butadiene-acrylonitrile-rubber/polyvinyl chloride blend will serve predominantly for plasticizing the hard polyvinyl chloride and only to a considerably lesser extent the plasticizer will be taken up by the butadiene-acrylonitrile-rubber, than would be the case upon separate mixing of polyvinyl chloride and plasticizer into the rubber. Thus by proceeding as described above the effectiveness of the plasticizer is greatly improved.

Furthermore, the ripening makes it possible that highly active fillers may be admixed jointly with larger proportions of plasticizer into the rubber since the ripened plastisol contains only very little free plasticizer.

A further advantage of the ripening will be found in the shortening of the gelling period which after a ripening period of for instance one week is only about half as long as prior to such ripening. Due to the shortening of the gelling period, the mixing period is also shortened. The ripening period should be at least about half a day.

At mixing temperatures below the temperature at which, by slightly gelling, the plastisol solidifies, very soft mixtures are obtained which can be easily worked up.

If during the mixing the temperature is permitted to rise to a temperature of about 110° C. or more, mixtures are obtained which can be extruded or calendered quickly and with little swelling. If the mixing temperature is permitted to rise above the gelation temperature, the Mooney viscosity of the mixture will become considerably higher, the extrusion rate slower and the swelling during extrusion will be increased, however, generally, the physical properties are improved.

It is possible to add conventional blowing agents so as to form blends of which formed products may be produced.

It is also possible in the manner described above to produce not only vulcanizable rubber/polyvinyl chloride blends, but also blends having thermoplastic properties. The mixing method remains the same, however, the vulcanizing agents are omitted. However, in the latter case gellation is required. The blend may be heated to gellation temperature either during mixing or during curing.

The present invention has been described, by way of example only, with respect to the forming of a blend of butadiene-acrylonitrile-rubber and polyvinyl chloride, because blends of this type have advantages for many purposes. The method of the invention is not limited to blending polyvinyl chloride with a special type of rubber or rubberlike material, but is of general applicability. However, the physical properties of the blends of polyvinyl chloride with various types of rubber are, as is already known, very different. Excellent properties can be attained with synthetic rubbers which can be, in an uncured state, thermoplastically welded with polyvinyl chloride. Blended with such types of rubber, polyvinyl chloride causes a reinforcing effect like reinforcing fillers. Such types of rubber are for instance the above mentioned butadiene-acrylonitrile-rubber, chlorosulfonated polyethylene, and polyurethane. Ethylene vinyl acetate can also be used. Good properties can also be attained by using blends of different types of rubbers comprising rubber of a type which can be welded with polyvinyl chloride, for instance butadiene-acrylonitrile-rubber, and rubber of a type which cannot be welded with polyvinyl chloride but is compatible with the other rubber of the rubber blend, for instance butadiene-styrol-rubber.

In addition, the method of the present invention may also be carried out to produce thermoplastic blends with non cross-linkable thermoplastic plastics, for instance with thermoplastic polyurethane, since it is without significance for the mixing method of the present invention whether the polymer may be cross-linkable or not.

A particular advantage of the method of the present invention will be found in the outstandingly uniform dispersion of the butadiene-acrylonitrile-rubber, polyvinyl-chloride and plasticizer, which does not depend on the acrylonitrile content of the butadiene-acrylonitrile-rubber, the K-value and the method by which the polyvinyl chloride has been produced (emulsion or suspension polymerizate) nor does the method of the present invention depend on the exact mixing temperature within the operative range. Furthermore, it is possible to carry out the method of the present invention with the conventional mixing devices available in rubber factories. The fact that any desired proportion of butadiene-acrylonitrile-rubber may be blended with polyvinyl chloride without causing difficulties in the mixing process gives a highly advantageous opportunity of adapting the formulation to the desired properties of the final blend. Furthermore, the possibility of successively mixing all components of the mixture in a single step operation, including the highly active fillers together with large quantities of plasticizer, and carrying out the entire mixing in an internal mixer, for instance of the Banbury type, in one short operation, results in a simple, reliable, quick, and thus economical method of producing the blend.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. The method of forming a vulcanizable blend of polyvinyl chloride and butadiene acrylonitrile rubber, the said method comprising the steps of forming a plastisol comprising (a) a pastable polymerizate or co-polymerizate of vinyl chloride, (b) a plasticizer or mixture of plasticizers, and (c) a thermal stabilizer for said polyvinyl chloride; allowing said plastisol to ripen for at least about half a day at room temperature; and thereafter forming an intimate mixture of said ripened plastisol and said butadiene acrylonitrile rubber.

2. The method of claim 1, wherein the temperature is permitted to rise during formation of said intimate mixture between said plastisol and said butadiene acrylonitrile rubber so as to solidify said plastisol.

3. The method of claim 1, wherein a solution is prepared of said butadiene acrylonitrile rubber and the said ripened plastisol is incorporated by mixing into said solution at room temperature.

References Cited

FOREIGN PATENTS

| | | |
|---|---|---|
| 773,938 | 5/1957 | Great Britain. |
| 1,320,721 | 2/1963 | France. |

ALLAN LIEBERMAN, Primary Examiner.

U.S. Cl. X.R.

260—890, 891